United States Patent
Kitai et al.

(10) Patent No.: US 10,479,917 B2
(45) Date of Patent: Nov. 19, 2019

(54) WATER-SOLUBLE CUTTING/GRINDING FLUID

(71) Applicant: NTN CORPORATION, Osaka-shi (JP)

(72) Inventors: Masashi Kitai, Iwata (JP); Kohei Higashi, Iwata (JP); Hidekazu Hirano, Iwata (JP); Hajime Isa, Iwata (JP); Masanori Nishira, Yamatokoriyama (JP); Hitoshi Shiotani, Yamatokoriyama (JP); Keiji Iwamoto, Yamatokoriyama (JP); Youhei Migaki, Yamatokoriyama (JP)

(73) Assignee: NTN Corporation, Osaka (JP)

( * ) Notice: Subject to any disclaimer, the term of this patent is extended or adjusted under 35 U.S.C. 154(b) by 105 days.

(21) Appl. No.: 14/894,690

(22) PCT Filed: May 28, 2014

(86) PCT No.: PCT/JP2014/064070
§ 371 (c)(1),
(2) Date: Nov. 30, 2015

(87) PCT Pub. No.: WO2014/192789
PCT Pub. Date: Dec. 4, 2014

(65) Prior Publication Data
US 2016/0108302 A1 Apr. 21, 2016

(30) Foreign Application Priority Data
May 31, 2013 (JP) .................................. 2013-115858

(51) Int. Cl.
*C09K 5/10* (2006.01)
*C10M 173/02* (2006.01)
(Continued)

(52) U.S. Cl.
CPC .................. *C09K 5/10* (2013.01); *B24C 1/08* (2013.01); *C10M 105/24* (2013.01);
(Continued)

(58) Field of Classification Search
CPC .......... C09K 5/10; B24C 1/08; C10M 105/24; C10M 129/08; C10M 129/16
See application file for complete search history.

(56) References Cited

U.S. PATENT DOCUMENTS

2003/0191037 A1* 10/2003 Rindo ...................... C11D 3/18
510/185
2011/0147645 A1 6/2011 Kawasaki
2012/0156123 A1* 6/2012 Hidaka ................ B28D 5/0076
423/348

FOREIGN PATENT DOCUMENTS

CN 102311860 A * 1/2012
CN 103013639 A 4/2013
(Continued)

OTHER PUBLICATIONS

Wang, "Machine Translation of CN102311860A".*
(Continued)

*Primary Examiner* — Monica S Carter
*Assistant Examiner* — Lauren M Beronja
(74) *Attorney, Agent, or Firm* — Morgan, Lewis & Bockius LLP

(57) ABSTRACT

The present invention addresses the problem of providing a water-soluble cutting or grinding fluid that has excellent permeability and washability, that can be widely used in cutting or grinding, and that is particularly suitable for use in superfinishing. The present invention provides a water-soluble cutting or grinding fluid that contains a glycol compound (A), at least one substance (B) selected from the group consisting of organic amines and inorganic alkalis, a surfactant (C), and water (D), the water-soluble cutting or
(Continued)

grinding fluid having a contact angle of 2 to 15° as measured using the θ/2 method one second after a drop of a dilution of the water-soluble cutting or grinding fluid is dropped on an SPCC-SB plate.

20 Claims, 2 Drawing Sheets

(51) Int. Cl.
*B24C 1/08* (2006.01)
*C10M 105/24* (2006.01)
*C10M 129/08* (2006.01)
*C10M 129/16* (2006.01)
*C10M 133/08* (2006.01)

(52) U.S. Cl.
CPC ........ *C10M 129/08* (2013.01); *C10M 129/16* (2013.01); *C10M 133/08* (2013.01); *C10M 173/02* (2013.01); *C10M 2207/022* (2013.01); *C10M 2207/046* (2013.01); *C10M 2207/126* (2013.01); *C10M 2209/104* (2013.01); *C10M 2209/108* (2013.01); *C10M 2215/04* (2013.01); *C10M 2215/042* (2013.01); *C10M 2219/024* (2013.01); *C10N 2230/06* (2013.01); *C10N 2230/12* (2013.01); *C10N 2240/401* (2013.01); *C10N 2240/408* (2013.01)

(56) References Cited

FOREIGN PATENT DOCUMENTS

| | | | |
|---|---|---|---|
| JP | 10053757 A | * | 2/1998 |
| JP | H10-053757 A | | 2/1998 |
| JP | H11-279581 A | | 10/1999 |
| JP | 2000-313896 A | | 11/2000 |
| JP | 2002-338988 A | | 11/2002 |
| JP | 2003-082335 A | | 3/2003 |
| JP | 3591995 B2 | | 9/2004 |
| JP | 2005-343955 A | | 12/2005 |
| JP | 2007-186537 A | | 7/2007 |
| JP | 2012-092205 A | | 5/2012 |
| JP | 2012-251025 A | | 12/2012 |
| WO | 2010/021299 A1 | | 2/2010 |

OTHER PUBLICATIONS

Kaimenkasseizai Nyumon (Introduction to Surfactants), Jun. 11, 2007, pp. 32-39 (with partial translation).
Extended European Search Report issued in corresponding European Patent Application No. 14804769.9 dated Feb. 14, 2017.

* cited by examiner (a)

(b)

$\gamma_s$ ··· Solid surface tension
$\gamma_L$ ··· Liquid surface tension
$\gamma_{SL}$ ··· Solid-liquid interfacial tension $$\gamma_s = \gamma_L \cdot \cos\theta + \gamma_{SL}$$

WATER-SOLUBLE CUTTING/GRINDING FLUID

TECHNICAL FIELD

The present invention relates to a water-soluble cutting or grinding fluid that has excellent permeability and washability.

BACKGROUND ART

Grinding fluids used in grinding can be roughly classified into water-soluble grinding fluids, which have water as a base, and water-insoluble grinding fluids, which have oil as a base. Water-soluble grinding fluids have excellent cooling properties and environmental friendliness, whereas water-insoluble grinding fluids have excellent processing performance and swarf washability. In general, in grinding of small machine parts, a water-insoluble grinding fluid is used because of the importance of productivity and quality, whereas in grinding of other parts, a water-soluble grinding fluid is used because of the importance of cooling.

In the cutting of hardened steel, which has been replacing grinding in recent years, swarf becomes hot and poses the risk of catching fire; therefore, the use of a water-soluble fluid that is non-flammable is required.

Among various types of grinding, superfinishing grinding (hereinafter simply referred to as "superfinishing") is a processing method for obtaining a smooth and high-precision processed surface in a short time. This method is often used in a final finishing step for machine parts, such as bearing parts.

In superfinishing, superfinishing grindstones designed specifically for superfinishing are used. A superfinishing grindstone generally has a bar-like or cylindrical shape. While vibrating, oscillating, or rotating the grindstone, the grindstone is pressed at a constant pressure against a workpiece that is rotating at a high speed, thus processing the workpiece.

As abrasive particles of a superfinishing grindstone, CBN (cubic boron nitride), WA (white alumina), GC (green silicon carbide), diamond, etc., can be used. The particle size of a superfinishing grindstone is generally about #400 to #8000 and has a particle size smaller than that of grindstones used in general grinding. Since a superfinishing grindstone comprises such fine grinding particles, swarf produced in superfinishing is much finer than swarf produced in general grinding. Furthermore, since superfinishing is performed with a superfinishing grindstone under constant pressure being in contact with the surface of the workpiece, liquid exhaustion on the processing surface is likely to occur, which results in sudden stagnation of the processing due to local clogging of the grindstone. In view of such processing characteristics, water-insoluble grinding fluids that have excellent liquid permeability to the processing surface and excellent diffusibility (washability) of fine swarf in liquid have been generally used.

For example, inner and outer races of a bearing can be manufactured by using a manufacturing process as illustrated in FIG. 1. In the grinding steps before superfinishing, a water-soluble grinding fluid is used as grinding fluid, whereas only in superfinishing, which is the final finishing step, a water-insoluble grinding fluid is inevitably used for the reasons described above.

The water-insoluble grinding fluid for superfinishing, however, is generally classified into the Fourth Group, Third Class Petroleum, of Hazardous Materials, and is designated as a flammable hazardous material under the Fire Defense Law of Japan. A grinding fluid for superfinishing that is supplied to the processing point is stirred and misted by the motion of the workpiece and tool. Accordingly, there has been strong demand for improving the work environment for the superfinishing step. Although a water-soluble grinding fluid used in general grinding may also be used for superfinishing, conventional water-soluble grinding fluids for general grinding have unsatisfactory liquid performance; therefore, using such a conventional water-soluble grinding fluid for superfinishing causes the problem of grindstone clogging, thus leading to failure in processing.

Proposed as water-soluble grinding fluid for solving this problem is a water-soluble grinding fluid that contains not inorganic salts but an alkaline component that inhibits polynuclear complexation by forming a coating layer on ferrous hydroxide formed on the surface of a workpiece to be processed and thereby inhibiting the ferrous hydroxide from converting to a polynuclear complex (PTL 1). The grinding fluid disclosed in PTL 1 inhibits the reaction of converting ferrous hydroxide to ferric hydroxide or the reaction of converting ferric hydroxide to a polynuclear complex by the function of the component inhibiting polynuclear complexation, thus inhibiting adhesion of swarf to the grindstone and preventing clogging; however, the effect of inhibiting grindstone clogging was insufficient with this method.

CITATION LIST

Ptl

PTL 1: Japanese Patent No. 3,591,995

SUMMARY OF INVENTION

Technical Problem

An object of the present invention is to provide a water-soluble cutting or grinding fluid that has excellent permeability and washability, can be widely used in cutting and grinding, and is particularly suitable for use in superfinishing.

Another object of the present invention is to provide a superfinishing process and superfinishing device using the water-soluble cutting or grinding fluid, and a composite processing method and processing device with which either grinding or cutting, and superfinishing, can be performed in the same equipment.

Solution to Problem

The present inventors conducted extensive research to achieve the above object. As a result, they found that when a glycol compound, an alkaline substance, a surfactant, and water are mixed at a specific ratio and the resulting mixture has a contact angle within a specific range, the above object can be solved. The present invention has been accomplished based on these findings.

Specifically, the present invention provides the following water-soluble cutting or grinding fluid, etc.

1. A water-soluble cutting or grinding fluid comprising a glycol compound (A), at least one substance (B) selected from the group consisting of organic amines and inorganic alkalis, a surfactant (C), and water (D), the fluid having a contact angle of 2 to 15° as measured using the θ/2 method one second after a drop of a dilution of the water-soluble cutting or grinding fluid is dropped on an SPCC-SB plate.

2. The water-soluble cutting or grinding fluid according to Item 1, wherein the component (A) is at least one member selected from the group consisting of ethylene glycol, propylene glycol, diethylene glycol monoethyl ether, diethylene glycol dibutyl ether, diethylene glycol monohexyl ether, and diethylene glycol mono-2-ethylhexyl ether.

3. The water-soluble cutting or grinding fluid according to Item 1 or 2, wherein the component (B) is at least one member selected from the group consisting of triethanolamine, triisopropanolamine, monoisopropanolamine, and mono-sec-butanolamine.

4. The water-soluble cutting or grinding fluid according to any one of Items 1 to 3, wherein the component (C) is a nonionic surfactant.

5. The water-soluble cutting or grinding fluid according to Item 4, wherein the nonionic surfactant is polyoxyethylene alkyl ether.

6. The water-soluble cutting or grinding fluid according to any one of Items 1 to 5, wherein the component (A) is present in an amount of 5 to 80 wt. %, the component (B) is present in an amount of 1 to 30 wt. %, the component (C) is present in an amount of 5 to 30 wt. %, and the component (D) is present in an amount of 5 to 80 wt. %.

7. The water-soluble cutting or grinding fluid according to any one of Items 1 to 6, wherein the contact angle is measured using the water-soluble cutting or grinding fluid diluted 1 to 30 times.

8. The water-soluble cutting or grinding fluid according to any one of Items 1 to 7, further comprising 1 to 20 wt. % of a fatty acid.

9. The water-soluble cutting or grinding fluid according to any one of Items 1 to 8, further comprising 1 to 20 wt. % of a sulfurized fatty acid.

10. A superfinishing process comprising superfinishing a workpiece while rotating the workpiece and pressing a grindstone against the workpiece with the grindstone being oscillated in a direction perpendicular to the tangential direction of the workpiece rotation, the superfinishing being performed using the water-soluble cutting or grinding fluid according to any one of Items 1 to 9 between the workpiece and the grindstone.

11. A superfinishing device comprising a superfinishing machine for superfinishing a workpiece while rotating the workpiece and pressing a grindstone against the workpiece with the grindstone being oscillated in a direction perpendicular to the tangential direction of the workpiece rotation, and a blast nozzle for supplying the water-soluble cutting or grinding fluid according to any one of Items 1 to 9 between the workpiece and grindstone.

12. The superfinishing device according to Item 11, further comprising an in-process gauge for detecting a decrease in workpiece size resulting from processing with the grindstone.

13. A composite processing method comprising performing either a cutting or grinding process and the superfinishing process according to Item 10 in one processing unit.

14. A processing device comprising a cutting or grinding device and the superfinishing device according to Item 11 or 12 that are combined into one processing unit.

Advantageous Effects of Invention

The present invention can provide a water-insoluble cutting or grinding fluid that has excellent liquid permeability to the processing surface and excellent diffusibility (washability) of fine swarf in liquid. This enables using a water-soluble cutting or grinding fluid in superfinishing, for which previously, water-insoluble grinding fluids were used.

Using the cutting or grinding fluid of the present invention in superfinishing eliminates the need to install a fire extinguisher on the superfinishing machine, which is required in conventional superfinishing using a water-insoluble grinding fluid that is flammable, thus reducing processing costs by simplifying the equipment.

The water-soluble cutting or grinding fluid of the present invention, which has a higher degree of cooling properties than conventional water-insoluble grinding fluids, can efficiently remove the processing heat produced in superfinishing. This allows an in-process gauge to be installed on superfinishing devices, which previously could not use an in-process gauge due to thermal expansion caused by processing heat, so that workpiece size can be controlled by using an in-process gauge. As a result, in particular, in the process of manufacturing bearings, a matching step according to the size of a rolling element can be simplified or omitted, thus reducing processing costs.

In the bearing manufacturing process, the water-soluble cutting or grinding fluid of the present invention can be used in general grinding processes, such as width grinding, outer-diameter grinding (centerless grinding and cylindrical grinding), and internal grinding, as shown in FIG. 1. This allows for production using the same type of water-soluble cutting or grinding fluid from grinding through to superfinishing. For example, even in grinding of large parts for which cooling properties of water-soluble cutting or grinding fluid are an important consideration, general grinding and superfinishing can be performed in the same equipment.

Further, in superfinishing using a conventional water-insoluble grinding fluid, for example, it is virtually impossible to perform hardened steel cutting, which produces hot chips, and superfinishing in the same equipment. In contrast, the cutting or grinding fluid of the present invention is water-soluble and poses a low risk of catching fire; therefore, this enables hardened steel cutting and superfinishing to be performed in the same equipment.

Using the water-soluble cutting or grinding fluid in superfinishing can thus achieve composite processing comprising hardened steel cutting or general grinding, and superfinishing, using one and the same equipment. Further, since the water-soluble cutting or grinding fluid of the present invention has excellent washability, the same fluid can be used from grinding through to washing to manufacture a product. This can reduce the pieces of equipment, equipment costs, setup time, adjustment time, product transfer time, etc., and thus increase productivity, thereby reducing processing costs.

Further, using only one type of fluid in the same equipment can reduce the likelihood of mixing a water-soluble fluid into a water-insoluble fluid or mixing a water-insoluble fluid into a water-soluble fluid, and thus reduce changes in liquid performance. Accordingly, compared to conventional manufacturing processes, in which a different fluid is used in each piece of equipment, using the water-soluble cutting or grinding fluid of the present invention can simplify or unify the device in the relevant aspects, such as supply and discharge of fluid and waste liquid treatment, thus reducing management costs.

BRIEF DESCRIPTION OF DRAWINGS

FIG. 1(a) shows a process of manufacturing an inner race. FIG. 1(b) shows a process of manufacturing an outer race.

DESCRIPTION OF EMBODIMENTS

Figure 1:
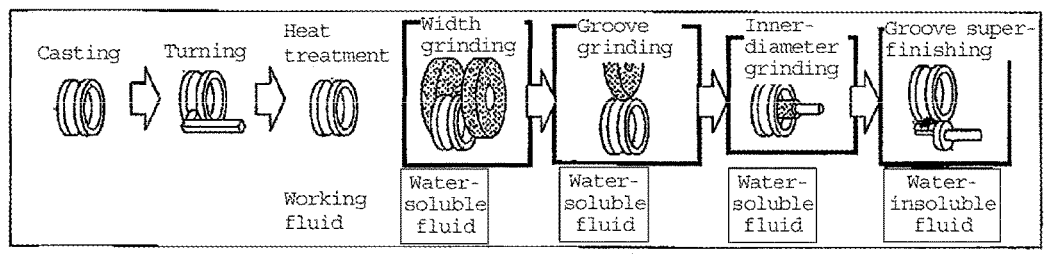
FIG. 1 is a schematic diagram showing a conventional process of manufacturing bearings, and cutting or grinding fluids used in the manufacturing process.
Figure 1:
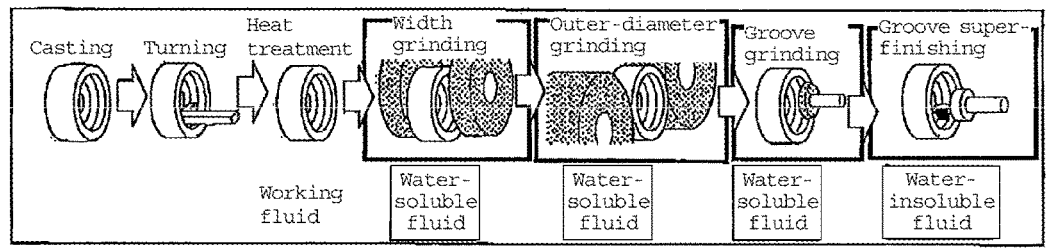

The present invention is described in detail below.

The water-soluble cutting or grinding fluid of the present invention comprises a glycol compound (A), an alkaline substance (B), a surfactant (C), and water (D) as essential components.

The glycol compound (A) (hereinafter sometimes referred to as "component (A)") is used to enhance wettability and washability of grinding powder. Examples of component (A) include alkylene glycols such as ethylene glycol and propylene glycol; ethylene glycol ethers such as ethylene glycol monomethyl ether, ethylene glycol monoethyl ether, ethylene glycol monobutyl ether, diethylene glycol monoethyl ether, triethylene glycol monoethyl ether, diethylene glycol dibutyl ether, ethylene glycol monohexyl ether, diethylene glycol monohexyl ether, ethylene glycol mono-2-ethylhexyl ether, and diethylene glycol mono-2-ethylhexyl ether; and propylene glycol ethers such as propylene glycol monopropyl ether, propylene glycol monomethyl ether, propylene glycol monomethyl ether acetate, dipropylene glycol monomethyl ether, propylene glycol monobutyl ether, dipropylene glycol monobutyl ether, and dipropylene glycol monophenyl ether. Among these compounds, ethylene glycol, propylene glycol, diethylene glycol monoethyl ether, diethylene glycol dibutyl ether, diethylene glycol monohexyl ether, and diethylene glycol mono-2-ethylhexyl ether are preferable. Propylene glycol and diethylene glycol mono-2-ethylhexyl ether are more preferable.

Component (A) may be used singly or in a combination of two or more. Component (A) is preferably a combination of propylene glycol and diethylene glycol mono-2-ethylhexyl ether.

The amount of component (A) to be incorporated is typically about 5 to 80 wt. %, preferably about 20 to 60 wt. %, based on the total weight of the water-soluble cutting or grinding fluid. Less than 5 wt. % of component (A) may result in poor wettability, whereas more than 80 wt. % of component (A) may result in a hazardous material under the Fire Defense Law of Japan.

An alkaline substance is used to prevent iron parts from rusting. As the alkaline substance, at least one substance selected from the group consisting of organic amines and inorganic alkalis (hereinafter sometimes referred to as "component B") is used. Examples of organic amines include alkanolamines such as monoethanolamine, diethanolamine, triethanolamine, monoisopropanolamine, diisopropanolamine, triisopropanolamine, N-ethyldiethanolamine, N,N-diethylethanolamine, N-n-butylethanolamine, N-n-butyldiethanolamine, N-cyclohexyldiethanolamine, mono-sec-butanolamine, and di-sec-butanolamine; cycloalkylamines such as cyclohexylamine, dicyclohexylamine, cyclopentylamine, and dicyclopentylamine; benzylamine, dibenzylamine, and the like. Examples of inorganic alkalis include sodium hydroxide, potassium hydroxide, lithium hydroxide, sodium carbonate, potassium carbonate, and the like. Among these, triethanolamines and triisopropanolamines, which are tertiary alkanolamines, and monoisopropanolamine and mono-sec-butanolamine, which are primary alkanolamines, are preferable. In particular, triethanolamine is preferable in terms of skin irritation and price, and monoisopropanolamine is preferable in terms of pH maintenance and price.

Component (B) may be used singly or as a mixture of two or more. The amount of component (B) to be incorporated is typically about 1 to 30 wt. %, preferably about 5 to 20 wt. %, based on the total weight of the water-soluble cutting or grinding fluid of the present invention. Less than 1 wt. % of component (B) may result in an excessively low pH of the water-soluble cutting or grinding fluid, which impairs rust-proofing of the machine or iron parts. On the other hand, more than 30 wt. % of component (B) may result in an excessively high pH of the grinding fluid, which causes workers to have rough skin, dermatitis, etc., due to increased skin irritation, and worsens the work environment.

The surfactant (hereinafter sometimes referred to as "component (C)") is used to stably dissolve substances that are insoluble in water-soluble cutting or grinding fluid. Examples of surfactants include nonionic surfactants, anionic surfactants, cationic surfactants, and the like. Among these, nonionic surfactants are preferable. Examples of nonionic surfactants include polyoxyethylene alkyl esters, polyoxyethylene alkyl ethers, polyoxyethylene alkyl phenol ethers, sorbitan alkyl ethers, and the like. Among these, polyoxyethylene alkyl ethers such as polyoxyethylene 2-ethylhexyl ether, polyoxyethylene oleylether, polyoxyethylene cetyl ether, and polyoxyethylene stearyl ether are preferable.

The amount of component (C) to be incorporated is typically about 5 to 30 wt. %, preferably about 5 to 20 wt. %, based on the total weight of the water-soluble cutting or grinding fluid. Less than 5 wt. % of component (C) may result in poor liquid stability, whereas more than 30 wt. % of component (C) may increase the amount of foaming.

The water-soluble cutting or grinding fluid of the present invention comprises water (D). The water content of the water-soluble cutting or grinding fluid of the present invention is preferably about 5 to 80 wt. %, and more preferably about 10 to 50 wt. %. The water to be used may be tap water, industrial water, ion-exchanged water, distilled water, or the like.

The water-soluble cutting or grinding fluid of the present invention may further comprise a lubricant. Examples of lubricants include fatty acids. Specific examples include fatty acids having 8 to 18 carbon atoms, such as nonylic acid, undecylic acid, caproic acid, caprylic acid, lauric acid, palmitic acid, oleic acid, beef tallow fatty acids, and linoleic acid. The amount of the lubricant to be incorporated is preferably about 1 to 20 wt. %, based on the total weight of the water-soluble cutting or grinding fluid.

The water-soluble cutting or grinding fluid of the present invention may further comprise an extreme pressure agent. Examples of extreme pressure agents include sulfur-based extreme pressure agents, such as sulfurized fats and oils and sulfurized fatty acids. The amount of the extreme pressure agent to be incorporated is preferably about 1 to 20 wt. %, and more preferably about 2 to 10%.

The water-soluble cutting or grinding fluid of the present invention may comprise other components, such as defoaming agents, cationic surfactants, preservatives, and inorganic salts. The amounts of such other components are not particularly limited.

Examples of defoaming agents include silicon-based defoaming agents such as polyorganosiloxane, alcohol-based defoaming agents, and the like.

Examples of cationic surfactants include alkyl trimethyl ammonium salts, dialkyl dimethyl ammonium salts, alkyl benzyl dimethyl ammonium salts, and the like.

Examples of preservatives include triazine preservatives, isothiazoline preservatives, morpholine preservatives, and the like.

As inorganic salts, borate, silicate, carbonate, phosphate, and the like can be incorporated to provide a builder effect.

The water-soluble cutting or grinding fluid of the present invention can be produced by mixing the various components mentioned above in a usual manner.

The water-soluble cutting or grinding fluid of the present invention is a stock cutting or grinding fluid. For use, the cutting or grinding fluid is diluted with water and then used. The dilution ratio is preferably in the range of about 1 to 30 times, and more preferably in the range of about 2 to 10 times.

A feature of the water-soluble cutting or grinding fluid of the present invention is that the cutting or grinding fluid has a contact angle of 2 to 150.

Figure 2:
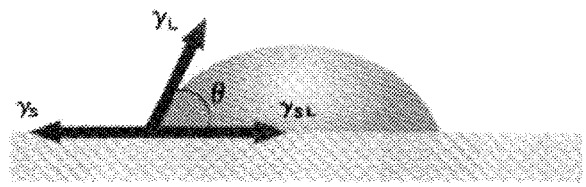
FIG. 2 is a conceptual diagram of a contact angle.

First, below is an explanation of the contact angle, which is a physical property value of a liquid. As shown in FIG. 2, when a liquid is dropped on the surface of a solid, the liquid has a round shape due to its surface tension, and Young's equation, given below, is satisfied:

$$\gamma_{SL} - \gamma_S + \gamma_L \cos\theta = 0$$

($\gamma_{SL}$: interfacial tension between a solid and a liquid, Ys: solid surface tension, $\gamma_L$: liquid surface tension). The angle between the tangent of the liquid and the solid surface in Young's equation is a contact angle θ. The contact angle θ is used as an index showing the wettability in the surface evaluation technique. The lower the contact angle between a liquid and a solid, the better the liquid will wet the surface of the solid; i.e., the liquid is determined to have higher wettability. The θ/2 method is generally used as a method for determining the contact angle θ. The θ/2 method determines the contact angle θ by doubling the angle between a straight line connecting the right or left end of a liquid drop and its apex, and a solid surface.

The contact angle referred to here is a value determined by dropping a drop of a dilution of the water-soluble cutting or grinding fluid (stock) of the present invention onto a SPCC-SB plate, which is a rolled-steel plate, and measuring the contact angle using a contact-angle measuring device (Drop Master 500, a contact angle meter produced by Kyowa Interface Science Co., Ltd.) by the drop method (θ/2 method) one second after the dropping. The liquid prepared by diluting the grinding fluid (stock) of the present invention with water 1 to 30 times and measured under the above conditions had a contact angle of 2 to 15°. The distilled water measured under the same conditions had a contact angle of 85 to 920.

The water-soluble cutting or grinding fluid of the present invention has a low contact angle of 2 to 15° and thus has good wettability and high permeability to the processing surface. Furthermore, the water-soluble cutting or grinding fluid of the present invention has a high degree of washability, lubricity, and clogging-inhibiting effects (see the Examples below.) Accordingly, the water-soluble cutting or grinding fluid of the present invention can be suitably used for superfinishing.

The present invention provides a superfinishing process using the water-soluble cutting or grinding fluid. A specific example of the superfinishing process comprises superfinishing a workpiece while rotating the workpiece and pressing a grindstone against the workpiece with the grindstone being oscillated in a direction perpendicular to the tangential direction of the workpiece rotation, the superfinishing being performed while supplying the water-soluble cutting or grinding fluid between the workpiece and the grindstone.

The present invention further provides a superfinishing device using the water-soluble cutting or grinding fluid. A specific example of the superfinishing device comprises the following: a superfinishing machine for superfinishing a workpiece by pressing a grindstone against the workpiece while rotating the workpiece and oscillating the grindstone in a direction perpendicular to the tangential direction of the workpiece rotation; and a blast nozzle for supplying the water-soluble cutting or grinding fluid between the workpiece and grindstone.

Figure 3:
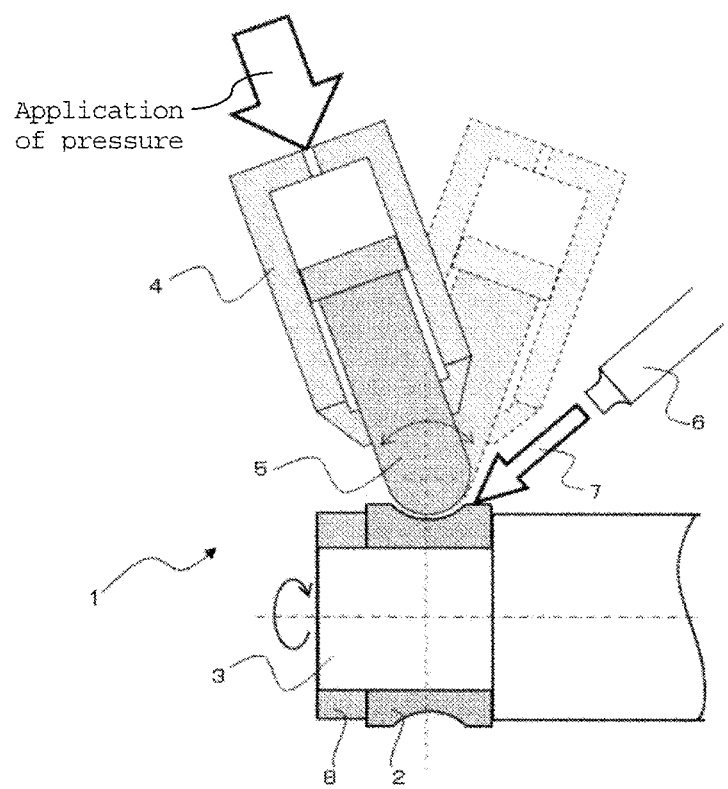
FIG. 3 is a schematic diagram showing the important part of a processing device according to the present invention.

The superfinishing device of the present invention is explained with reference to the schematic diagram shown in FIG. 3. FIG. 3 is a schematic diagram of the main part of the device when the workpiece is an inner race of the bearing. The superfinishing machine 1 comprises a main shaft 3 for holding a workpiece 2, and a grindstone 5 held by a grindstone-holding device 4. The main shaft 3 is rotated by an electric motor (not shown). The grindstone-holding device 4 comprises an electric motor (not shown), an oscillation mechanism (not shown), and a grindstone holder. The grindstone 5 is held by a grindstone holder and is oscillated by the functions of the electric motor and the oscillating mechanism. A blast nozzle 6 is disposed near the workpiece 2 and supplies the water-soluble cutting or grinding fluid 7 of the present invention between the workpiece 2 and the grindstone 5.

In the superfinishing device thus structured, the workpiece 2 is held between the main shaft 3 and a retaining plate 8 (including a clamp roller), and is rotated with the rotation of the main shaft 3. On the other hand, the grindstone 5 is oscillated by the electric motor and the oscillation mechanism with the grindstone 5 being in contact with the surface of the workpiece 2. The water-soluble cutting or grinding fluid 7 is supplied between the workpiece 2 and the grindstone 5. In this way, a water-soluble cutting or grinding fluid is used in the superfinishing device of the present invention; therefore, there is no need to install a fire extinguisher on the superfinishing machine, which is required when a flammable water-insoluble grinding fluid is used, thus reducing processing costs by simplifying the equipment.

The superfinishing device of the present invention can include an in-process gauge. The in-process gauge is for detecting changes in workpiece size during processing and comprises a stylus that is disposed to be in contact with a workpiece so as to measure the size of the workpiece as the processing progresses. In the superfinishing device of the present invention, a water-soluble cutting or grinding fluid is used. The water-soluble cutting or grinding fluid of the present invention has a higher degree of cooling properties than conventional water-insoluble grinding fluids, so that processing heat produced in the superfinishing step can be efficiently removed. Therefore, the superfinishing device of the present invention, which comprises a blast nozzle for supplying the water-soluble cutting or grinding fluid, can comprise an in-process gauge. This enables workpiece size control by using an in-process gauge in superfinishing, for which an in-process gauge previously could not be used because of thermal expansion due to processing heat. As a result, in particular, in the bearing manufacturing process, a matching step according to the size of a rolling element can be simplified or omitted, thus reducing processing costs.

In the bearing manufacturing process, the water-soluble cutting or grinding fluid of the present invention can be used in general grinding steps, such as width grinding, outer diameter grinding (centerless grinding, cylindrical grinding), and inner diameter grinding, as shown in FIG. 1. Further, in the process of manufacturing rolling elements, such as balls, cylindrical rollers, tapered rollers, and spherical rollers, water-soluble cutting or grinding fluids according to the general grinding steps described above can also be used. Thus, the same type of water-soluble cutting or grinding fluid can be used from grinding through to superfinishing to manufacture a product. For example, even in grinding of large parts for which cooling properties of the water-soluble cutting or grinding fluid to be used are an important consideration, general grinding and superfinishing can be performed in the same equipment.

In recent years, hardened steel cutting has been replacing all grinding steps except for superfinishing. The technique for replacing conventional grinding steps with hardened steel cutting is also already known. When superfinishing is performed after cutting the hardened steel, it has been virtually impossible to perform hardened steel cutting, which produces hot chips, and superfinishing, which uses conventional water-insoluble grinding fluid, in the same equipment. In contrast, the cutting or grinding fluid of the present invention is soluble in water and has a low risk of catching fire; therefore, hardened steel cutting and superfinishing can be performed in the same equipment.

The present invention thus provides a composite processing method that comprises performing either a cutting or grinding process and the superfinishing process described above in the same processing unit.

According to the present invention, using the water-soluble cutting or grinding fluid in superfinishing can achieve composite processing that comprises either hardened steel cutting or general grinding, and superfinishing, using the same equipment. Thus, the present invention can provide a processing device comprising either a cutting or grinding device and the superfinishing device described above combined into one processing unit. Further, since the water-soluble cutting or grinding fluid of the present invention has excellent washability, the same fluid can be used from grinding through to washing to manufacture a product. This can reduce the pieces of equipment, equipment costs, setup time, adjustment time, product transfer time, etc., which enhances productivity, thus reducing processing costs.

Further, using only one type of fluid in the same equipment can reduce the likelihood of mixing a water-soluble fluid into a water-insoluble fluid or mixing a water-insoluble fluid into a water-soluble fluid, thus reducing changes in liquid performance. Accordingly, compared to conventional manufacturing processes, which use a different lubricant for each piece of equipment, use of the water-soluble cutting/grinding fluid of the present invention can simplify or unify the device in relevant aspects, such as supply and discharge of fluid and waste liquid treatment, thus reducing management costs.

EXAMPLES

The invention is described below with reference to Examples, but should not be construed to be limited to these.

Various components were mixed in the proportions shown in Table 1 to prepare water-soluble cutting or grinding fluids of Examples and Comparative Examples. The cutting or grinding fluids were evaluated for liquid performance in terms of contact angle, frictional coefficient, dispersibility, and debris test, and for processing performance using a superfinishing test device. Table 1 shows the results.

(1) Measurement of the Contact Angle (Wettability Evaluation)
Test instrument: Drop Master 500, contact angle meter produced by Kyowa Interface Science Co., Ltd.
Analysis method: Drop method ($\theta$/2 method)
Dropping needle: Teflon®-coated needle
Measurement temperature: room temperature
Measurement method: A drop of each test fluid was dropped on an SPCC-SB plate. One second after the dropping, the contact angle of the drop was measured. This measurement was repeated 5 times.
The average of the five measurements was defined as the contact angle.

(2) Frictional Coefficient (Lubricity Evaluation)
Tester: Soda's pendulum-type oil property tester II (with a standard load)
Measurement temperature: room temperature
Measurement method: After each test fluid was supplied to the friction portion of a pendulum fulcrum where a pin roller comes into contact with balls, the pendulum was vibrated. The coefficient of friction was calculated from the vibration attenuation.

Figure 4:
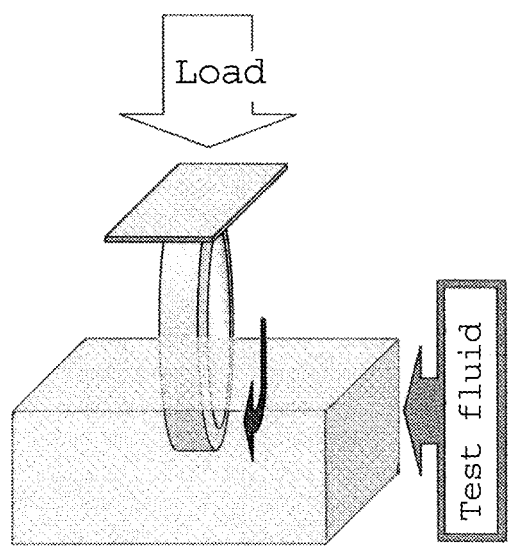
FIG. 4 is a schematic diagram illustrating the abrasive-paper debris test performed in the Examples.

(3) Carbon Sedimentation Test (Washability Evaluation)
Test Method:
Each test fluid was placed in a 100-mL cylinder. Carbon graphite with a particle size of about 1.0 µm was dropped on the liquid surface. The time until all the carbon graphite settled in the liquid was measured.
Test Conditions:
Liquid temperature: room temperature
Amount of carbon added: 0.2 g (4) Debris Test (Clogging Evaluation)
As shown in FIG. 4, a SUJ-2 ring was rotated for 1 minute with the lower half of the ring immersed in each test fluid and with a load of 90 g applied to an abrasive paper (#2000) glued to a mild steel plate. The wear of, and debris on, the abrasive paper and the degree of debris on the ring after 1 minute were observed. Specifically, the degree of debris on the ring was checked by applying cellophane tape to the ring and removing the tape therefrom.
Evaluation Criteria:
Degree of wear and debris of the abrasive paper:
A⁺: Very little
A: Little
B: Slight to moderate
C: High
Degree of debris on the cellophane tape removed from the ring:
A: Little
B: Slight to moderate
C: High (5) Superfinishing Test (See FIG. 3)
Test Conditions:
Workpiece material: SUJ-2
Workpiece circumferential speed: crude finishing: 200 m/min, superfinishing: 200 m/min
Number of grindstone oscillations: crude finishing: 800 c.p.m., superfinishing: 120 c.p.m.
Oscillation angle: crude finishing: 200, superfinishing: 200
Grindstone pressure: crude finishing: 0.2 MPa, superfinishing: 0.2 MPa
Processing time: crude finishing: 8 seconds, superfinishing: 2 seconds
Test fluid dilution ratio: 5 times Number of workpieces used for evaluation:
Machining allowance: 5
Grindstone wear: 5
Roughness Ra: 2 (the average roughness of the first and fifth workpieces)
Inhibition of clogging: The working surface of the grindstone was observed before processing and after processing 5 workpieces.
Evaluation criteria for degree of clogging: metal fusion to the grindstone working surface after processing 5 workpieces
A: None to little
B: Some
C: Much

TABLE 1

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| TEA (*1) | | 1 | 1 | 1 | 1 | 2 | 1 | | | 1 |
| MIPA (*2) | | | 0.5 | 0.5 | | 0.5 | 0.5 | | | 0.5 |
| PG (*3) | | 70 | 50 | 50 | 50 | 50 | 25 | | | 50 |
| EHDG (*4) | | 5 | 5 | 5 | 5 | 3 | 10 | | | 1 |
| Nonionic surfactant (*5) | | 10 | 15 | 15 | 15 | 15 | 20 | | | 4 |
| Cationic surfactant (*6) | | | | | 2 | | | | | |
| Sulfur extreme pressure agent (*7) | | | | 2 | | | | | | |
| Organic acid (*8) | | | 2 | | | 2 | 2 | | | |
| Water | | 14 | 26.5 | 26.5 | 27 | 25.5 | 41.5 | | | 43.5 |
| Water-insoluble fluid (*9) | | | | | | | | 100 | | |
| Water-soluble fluid (*10) | | | | | | | | | 100 | |
| Dilution ratio | | x 5 | x 5 | x 5 | x 5 | x 5 | x 5 | | x 5 | x 5 |
| Contact angle (°) | | 7.3 | 9.2 | 8.0 | 6.7 | 14.3 | 2.6 | 10.8 | 33.4 | 22.1 |
| Frictional coefficient | | 0.36 | 0.11 | 0.14 | 0.35 | 0.07 | 0.14 | 0.13 | 0.12 | 0.36 |
| Carbon sedimentation test (s) | | 3 | 3 | 3 | 3 | 3 | 3 | 12 | 11 | 3 |
| Debris test (abrasive paper) | | A | A | A+ | A | A+ | A | A+ | C | B |
| Debris test (cellophane tape (ring)) | | A | A | A | A | A | A | A | B | B |
| Superfinishing test (WA #3000 grindstone) | Machining allowance (μm) | 10.7 | 10.8 | 11.6 | 11 | 11.2 | 11.8 | 8.1 | 2 | 5 |
| | Wear amount (μm) | 11.2 | 11.2 | 8.2 | 10.2 | 11.8 | 21.6 | 6.0 | 1 | 41 |
| | Roughness Ra (μm) | 0.0268 | 0.0293 | 0.0295 | 0.0297 | 0.0379 | 0.0432 | 0.0475 | 0.1412 | 0.09 |
| | Inhibition of clogging | A | A | A | A | A | A | A | C | C |

Each component shown in Table 1 means the following.
(*1) TEA: triethanolamine
(*2) MIPA: monoisopropanolamine
(*3) PG: propylene glycol
(*4) EHDG: diethylene glycol mono-2-ethylhexyl ether
(*5) Polyoxyethylene 2-ethylhexyl ether
(*6) Dodecyl trimethyl ammonium chloride
(*7) Sulfated fatty acid
(*8) Oleic acid
(*9) Daikatoll MS-10T, produced by Daido Chemical Industries, Co., Ltd.
(*10) Cimiron PA-332YT (not containing glycols), produced by Daido Chemical Industries, Co., Ltd.

Table 1 shows that the water-soluble cutting or grinding fluids of Examples 1 to 6 have permeability and washability that are equivalent to those of the water-insoluble cutting or grinding fluids of Comparative Example 1. Accordingly, the water-soluble cutting or grinding fluids of Examples 1 to 6 can be used in place of the water-insoluble cutting or grinding fluid in superfinishing.

DESCRIPTION OF REFERENCE NUMERALS

1 Superfinishing machine
2 Workpiece
3 Main shaft
4 Grindstone-holding device
5 Grindstone
6 Blast nozzle
7 Water-soluble cutting or grinding fluid
8 Retaining plate

The invention claimed is:

1. A water-soluble cutting or grinding fluid comprising
   glycol compounds (A) comprising propylene glycol and diethylene glycol mono-2-ethylhexyl ether,
   at least one substance (B) selected from the group consisting of triisopropanolamine, monoisopropanolamine, and mono-sec-butanolamine,
   a surfactant (C), and
   water (D),
   the water-soluble cutting or grinding fluid having a contact angle of 2 to 15° as measured using the θ/2 method one second after a drop of a dilution of the water-soluble cutting or grinding fluid is dropped on an SPCC-SB plate.

2. The water-soluble cutting or grinding fluid according to claim 1, wherein the surfactant (C) comprises a nonionic surfactant.

3. The water-soluble cutting or grinding fluid according to claim 2, wherein the nonionic surfactant comprises polyoxyethylene alkyl ether.

4. The water-soluble cutting or grinding fluid according to claim 1, wherein
   the glycol compounds (A) are present in an amount of 5 to 80 wt. %,
   the substance (B) is present in an amount of 1 to 30 wt. %,
   the surfactant (C) is present in an amount of 5 to 30 wt. %, and the water (D) is present in an amount of 5 to 80 wt. %.

5. The water-soluble cutting or grinding fluid according to claim 1, wherein the contact angle is measured using the water-soluble cutting or grinding fluid diluted 1 to 30 times.

6. The water-soluble cutting or grinding fluid according to claim 1, further comprising 1 to 20 wt. % of a fatty acid.

7. The water-soluble cutting or grinding fluid according to claim 1, further comprising 1 to 20 wt. % of a sulfurized fatty acid.

8. A superfinishing process comprising superfinishing a workpiece while rotating the workpiece and pressing a grindstone against the workpiece with the grindstone being oscillated in a direction perpendicular to a tangential direction of the workpiece rotation, the superfinishing being performed using the water-soluble cutting or grinding fluid according to claim 1 between the workpiece and the grindstone.

9. A superfinishing device comprising:
a superfinishing machine for superfinishing a workpiece while rotating the workpiece and pressing a grindstone against the workpiece with the grindstone being oscillated in a direction perpendicular to a tangential direction of the workpiece rotation, and
a blast nozzle for supplying the water-soluble cutting or grinding fluid according to claim 1 between the workpiece and grindstone.

10. The superfinishing device according to claim 9, further comprising an in-process gauge for detecting a decrease in workpiece size resulting from processing with the grindstone.

11. A composite processing method comprising performing either a cutting or grinding process and the superfinishing process according to claim 8 in one processing unit.

12. A processing device comprising a cutting or grinding device and the superfinishing device according to claim 9 that are combined into one processing unit.

13. A water-soluble cutting or grinding fluid comprising
(i) propylene glycol,
(ii) at least one substance selected from the group consisting of triisopropanolamine, monoisopropanolamine, and mono-sec-butanolamine,
(iii) a surfactant, and
(iv) water, the water-soluble cutting or grinding fluid having a contact angle of 2 to 15° as measured using the θ/2 method one second after a drop of a dilution of the water-soluble cutting or grinding fluid is dropped on an SPCC-SB plate.

14. The water-soluble cutting or grinding fluid according to claim 1, wherein the substance (B) is present in an amount of 5 to 30 wt. %.

15. The water-soluble cutting or grinding fluid according to claim 13, wherein the substance (B) present in an amount of 5 to 30 wt. %.

16. The water-soluble cutting or grinding fluid according to claim 1, wherein the at least one substance (B) is triisopropanolamine.

17. The water-soluble cutting or grinding fluid according to claim 1, wherein the at least one substance (B) is monoisopropanolamine.

18. The water-soluble cutting or grinding fluid according to claim 1, wherein the at least one substance (B) is mono-sec-butanolamine.

19. The water-soluble cutting or grinding fluid according to claim 13, wherein the at least one substance (B) is triisopropanolamine.

20. The water-soluble cutting or grinding fluid according to claim 13, wherein the at least one substance (B) is monoisopropanolamine.

* * * * *